(12) United States Patent
Zey et al.

(10) Patent No.: US 6,536,601 B1
(45) Date of Patent: Mar. 25, 2003

(54) SLUDGE SILO

(75) Inventors: Wolfgang Zey, Eningen (DE); Alexander Schmid, Gernsbach (DE)

(73) Assignee: Putzmeister Aktiengesellschaft (DE)

( * ) Notice: Subject to any disclaimer, the term of this patent is extended or adjusted under 35 U.S.C. 154(b) by 0 days.

(21) Appl. No.: 09/423,600

(22) PCT Filed: May 6, 1998

(86) PCT No.: PCT/EP98/02658
§ 371 (c)(1),
(2), (4) Date: Nov. 10, 1999

(87) PCT Pub. No.: WO98/55410
PCT Pub. Date: Dec. 10, 1998

(30) Foreign Application Priority Data

Jun. 3, 1997 (DE) .......................... 197 23 150

(51) Int. Cl.⁷ .................. C02F 11/00; B01D 33/01; B01D 29/05; B30B 9/06
(52) U.S. Cl. .............. 210/359; 210/396; 210/407; 210/413; 210/415; 210/474; 100/112; 100/116; 209/346; 209/352; 209/358
(58) Field of Search ............... 210/474, 359, 210/396, 407, 413, 415; 100/116, 112; 209/352, 358, 346

(56) References Cited

U.S. PATENT DOCUMENTS 4,343,233 A * 8/1982 Burgin

FOREIGN PATENT DOCUMENTS

JP 55-086596 * 6/1980
JP 55-086597 * 6/1980

* cited by examiner

Primary Examiner—Thomas M. Lithgow
(74) Attorney, Agent, or Firm—Pendorf & Cutliff

(57) ABSTRACT

The invention relates to a silo for sludge, especially sewage sludge, comprising a sludge-receiving part (12), a feeding part (16), said feeding part being located above the sludge-receiving part (12) and communicating with said sludge-receiving part (12) via a inlet (14), and a sludge-discharge device. Said sludge-discharge device is located in the lower area of the sludge-receiving part, and can preferably be connected to a pipeline system. According to the invention, a separator device (18) for removing foreign bodies is located in the area of the feeding part (16) so that the sludge which is temporarily stored in the silo can easily be used later on. Said separating device for removing foreign bodies (18) has a sieve grate (20) covering the inlet (14) and at least one counter-surface (22) positioned above said sieve-grate (20). Said sieve-grate and said counter-surface are able to move in relation to each other as sludge pushes through the sieve openings of said sieve-grate.

6 Claims, 3 Drawing Sheets

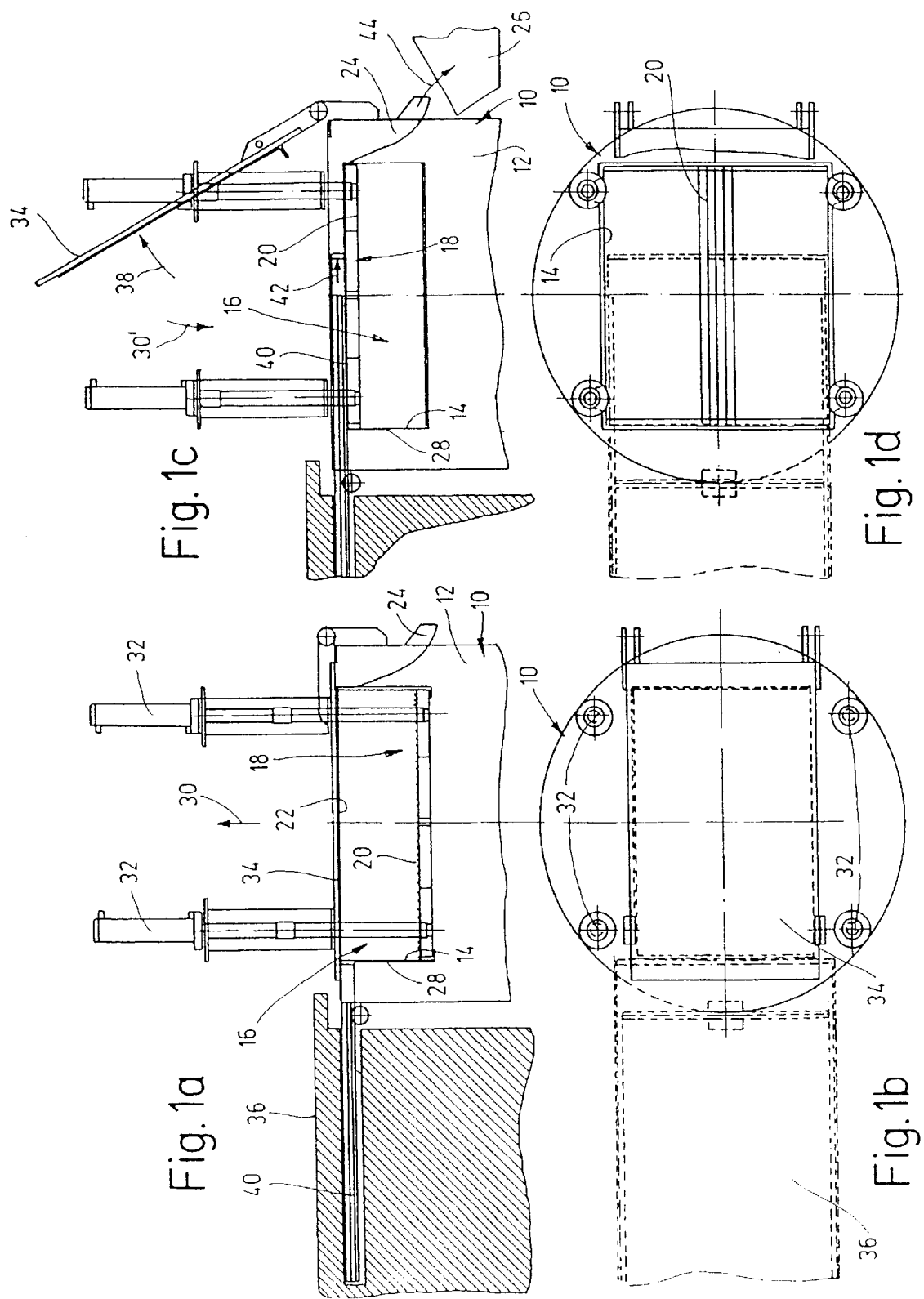

SLUDGE SILO

BACKGROUND OF THE INVENTION

1. Field of the Invention

The invention relates to a silo for sludge, especially sewage sludge, comprising a sludge-receiving part, a feeding part in communicating with said sludge-receiving part via an inlet, and a sludge-discharge device.

2. Description of the Related Art

Sludges which are temporarily stored in silos of this type are generally transported from the silo via a pipeline system to a disposal location, for example to a incineration facility. In order to prevent the entrainment of foreign bodies along with the sludge in the pipeline, which can lead to blockages in undefined areas thereof, it is known to provide incorporated sieves at various locations in the pipeline system, which respectively retain foreign bodies depending on the sieve size. In order to prevent a clogging of the sieves, these must be removed and cleaned at relatively short time intervals.

SUMMARY OF THE INVENTION

Beginning therewith, it is the task of the invention to provide precautionary measures in a silo for sludges and sewage sludges, which make it possible to dispense with the labor-intensive sieve devices in the down-stream equipment and systems.

The inventive solution is based upon the concept, that if a separating device for foreign bodies were to be located in the feeding part of the silo, the sludge withdrawn through the sludge discharge device would be in better condition for a problem-free further transport through the pipeline system. Since in sludges, such as sewage sludges which have a solids content of up to 70%, the foreign bodies are embedded in the sludge and cannot be separated from the sludge purely using sieves, it is proposed in accordance with a preferred embodiment of the invention, that the foreign body separating device has a sieve-grate covering the inlet and at least one counter-surface position above the sieve-grate, which sieve-grate and counter-surface are moveable in relation to each other as sludge pushes through the sieve openings of the sieve-grate. The foreign bodies, partially still soiled with sewage sludge, are retained by the sieve-grate and can either be removed by hand or mechanically before the next charge of sludge is introduced into the feeding part. For this it is useful when the foreign body separating device includes at least one foreign body outlet provided on the side of the sieve-grate opposite to the sludge-receiving part.

In accordance with a further preferred embodiment of the invention, the foreign body separation device includes a feed frame supplied with sludge and bordered by raised sidewalls, which is so positioned or positionable between the sieve-grate and the counter-surface, that the sieve-grate and/or the counter surface are moveable relative to each other transverse to the frame opening. A first variation of this embodiment envisions that the counter-surface is formed by the inner surface of a silo lid covering over the feed part, and that the sieve-grate is moveable by means of a preferably hydraulic drive through the feed frame which is provided fixed to the silo and in the direction of the silo lid. In order to make it possible to remove the sludge contaminated foreign bodies from the sieve-grate, a slideable sweeper or rake can be provided, in this case slideable parallel to the upper surface of the sieve-grate and in the direction of the foreign body outlet, which sweeper or rake can be driven by motor or hydraulically, when the sieve-grate is situated displaced towards its end position against the counter-surface.

In accordance with a related embodiment, a sieve-grate is provided fixed to the silo and covering over the inlet opening, while the counter-surface is provided in the form of a push- or pressure-plate, which is displaceable from above through the feed frame in the direction of the sieve-grate, preferably by means of a hydraulic drive. In this alternative embodiment there is preferably provided a feed frame which is displaceable relative to the supply part and the sieve-grate, which is open towards above and below, and which can be filled with sludge at a filling station situated on a base aligned with the sieve-grate and from which fill position it is moveable in the direction of the sieve-grate. For the transport away of the foreign bodies contaminated within the sewer sludge, the feed frame, with raised pressure plate, can be displaced relative to the sieve-grate in the direction of the foreign body outlet. The foreign body outlet preferably exhibits in this case an outlet opening which on its edges contacts the sieve-grate, via which the floor-side open supply frame is moveable with carrying along of the foreign bodies.

The hydraulic drive of the sieve-grate or, as the case may be, pressure plate occurs preferably using four simultaneously operable hydraulic cylinders engaging along the edge or corner area of the sieve-grate or, as the case may be, the pressure plate. Depending upon application, it is also possible to employ more or fewer hydraulic cylinders as the drive aggregate.

A further advantageous embodiment of the invention envisions that the counter-surface is formed by a wiper or skimmer surface perpendicular or diagonal to the direction of the sieve-grate and spring biased against the sieve-grate, wherein the sieve-grate and the skimmer or wiper are moveable relative to each other parallel to the upper surface of the sieve-grate. Preferably herein the sieve-grate is rotateable about a central axis relative to or with respect to the at least one silo-fixed wiper or skimmer. To order to facilitate the transport of larger foreign bodies to the foreign body outlet, there is provided supplementally, according to an advantageous embodiment of the invention, an abutment wall or stop for this type of foreign body at least in the close proximity above the sieve grate, radially oriented, which at the same time can function as the assembly or mounting wall for the wiper. Preferably, two wiper groups are provided separated from each other through the rotation center point of the sieve-grate, which serve therefore, that the sludge situated on the rotating sieve-grate is wiped or stripped spring-biased in the right direction and thereby pressed through the sieve-grate. The rotating sieve-grate is preferably surrounded by a jacket fixed to the silo, which includes at least one opening serving as foreign body outlet, which for control of a charge-wise foreign body output is preferably formed closeable or lockable.

The foreign body outlet can in all above-described variations open into a foreign body chamber, which can be acted upon with water for removal of the sewage sludge from the foreign bodies and can be connected via a sewage sludge conveyor section with the sludge receiving part of the silo.

BRIEF DESCRIPTION OF THE DRAWINGS

In the following, the invention will be described in greater detail on the basis of the drawings and the embodiments illustrated therein in schematic manner. There is shown:

FIGS. 1a and b—the feed part of the silo for sewage sludge with closed silo lid and lowered sieve-grate in vertical section and in top view.

FIGS. 1c and d—the feed part of the silo represented according to FIGS. 1a and b with opened silo lid, raised sieve-grate and partially advanced clearing-out pusher.

DETAILED DESCRIPTION OF THE INVENTION

Figure 2A:
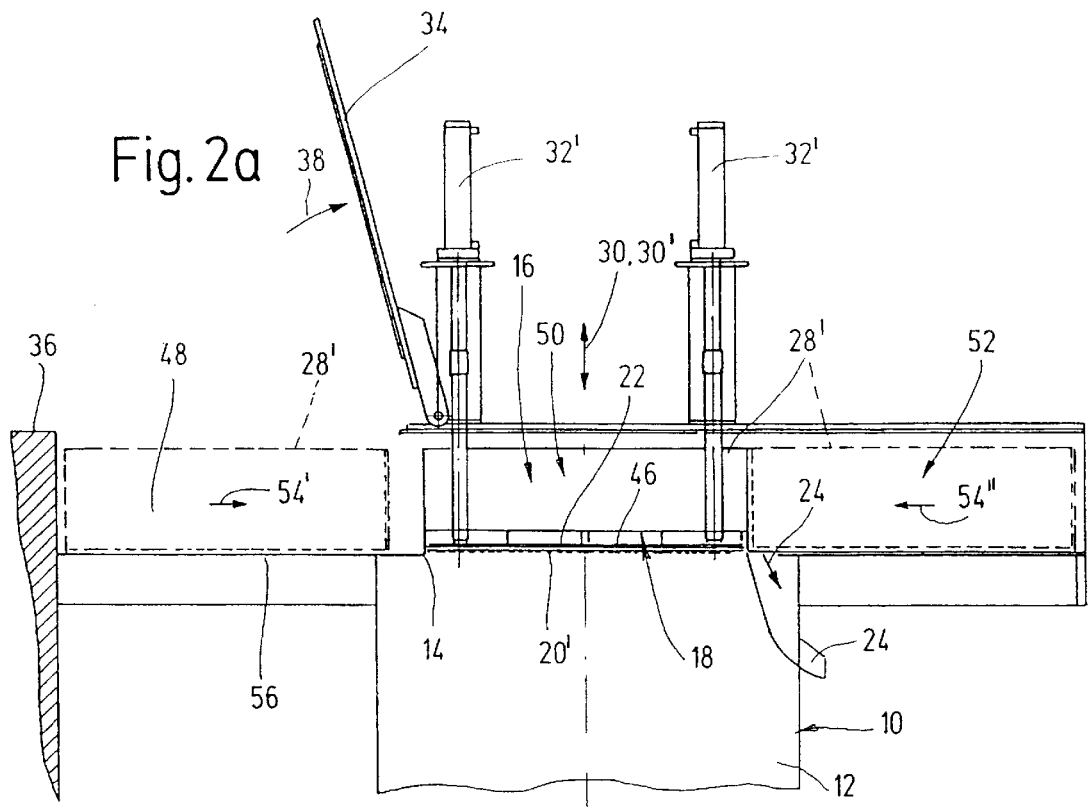
FIGS. 2a and b—the feed part of an embodiment of the invention deviating from that shown in FIG. 1, with a silo with sieve-grate fixed to the silo, vertically displaceable push-plate and sideways slideable feed frame in a partial sectional side-view and a top view.

The silo shown sectionally in the drawings is designed for the intermediate storage of sewage sludges with a solid component of up to 70%. The silo 10 is comprised essentially of a sludge-receiving part 12, a feeding part 16 located above the sludge-receiving part 12 and communicating with the sludge-receiving part via a large surface inlet opening 14, a slude-discharge device located in the lower area of the sludge-receiving part 12 and not shown, and a separator device 18 for separation of foreign bodies brought in by the supplied sludge and positioned at the height or elevation of the feed part 16. Foreign bodies contained in the sludge, such as screws, stones, and the like, can lead to disruptions in the pipeline systems down-stream of the silo as well as facilities such as mixing drums, dryers, or incinerator devices, which problems are avoided when using the separator device 18.

Figure 2B:
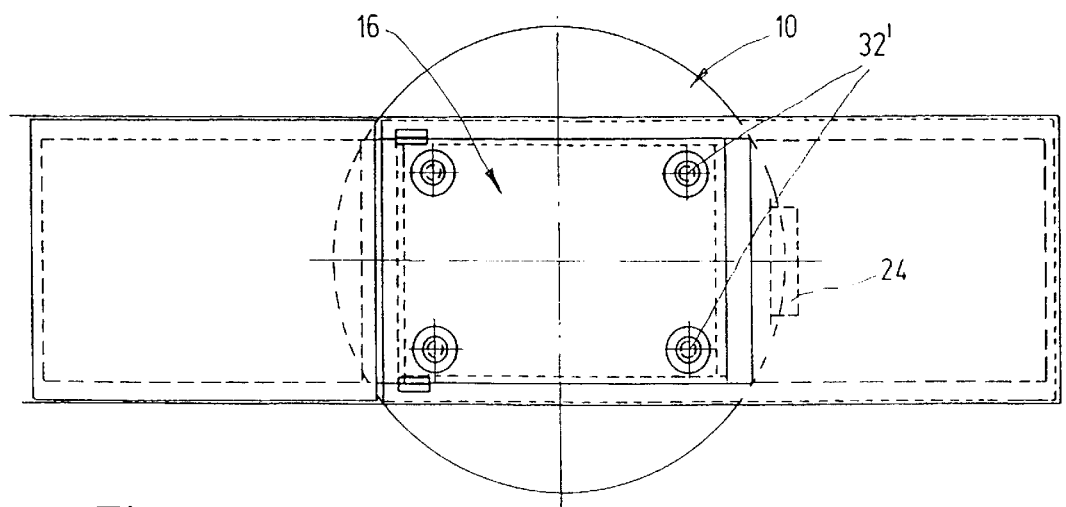
Figure 3A:
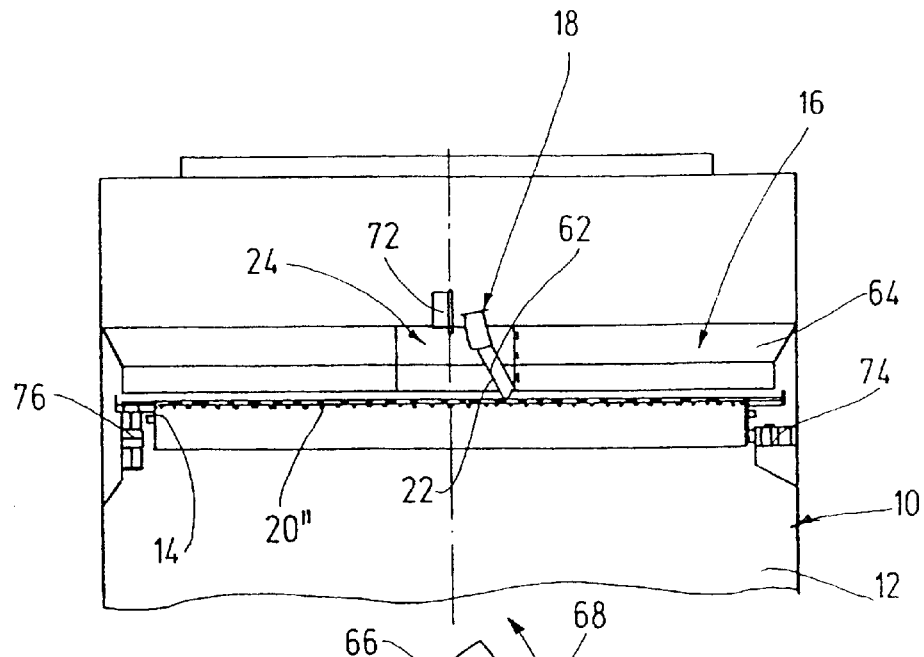
FIGS. 3a and b—the feed part of a further alternative embodiment of the invention of a sewage sludge silo with rotating sieve-grate and wipers or strippers in a vertical section and a top view.
Figure 3B:
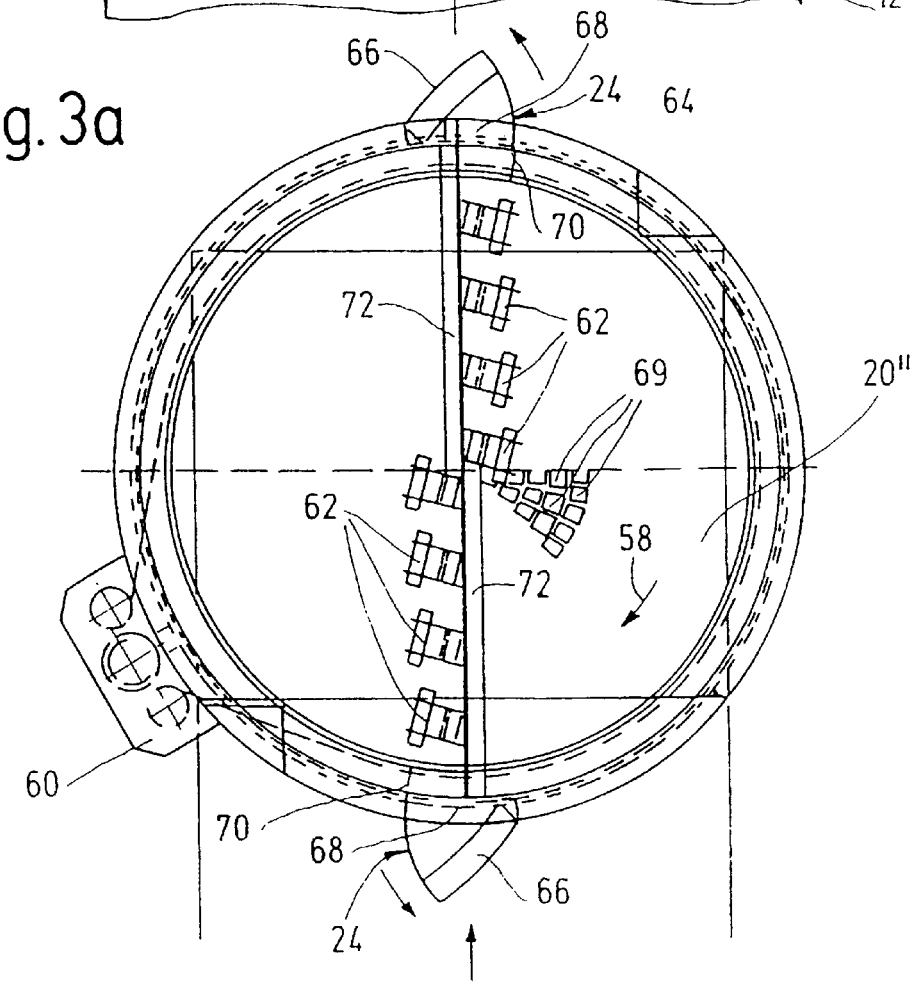

The foreign body separator devices 18 shown in the three illustrated embodiments according to FIGS. 1, 2, and 3 have in common a large surface inlet opening 14 situated above the rigid sieve-grate 20 and at least one counter-surface 22 provided above the sieve-grate, which are moveable relative to each other under the throughput pressure of sludge through the openings of the sieve-grate 20. The three illustrative embodiments further have in common a foreign body outlet 24 provided on the side of the sieve-grate 20 opposite to that of the sludge-receiving part 12 via which, after the pushing through of the sludge through the sieve-grate, the foreign bodies contaminated with sewage sludge remaining on the upper side thereof can for example be removed to an outwardly lying foreign body chamber 26. For cleansing of sludge from the foreign bodies the foreign body chamber can be acted upon with water, and therefrom resulting sewage sludge can be returned to the sludge-receiving part 12 of the silo.

In the embodiment shown in FIG. 1, the separation device 18 includes a feed frame 28 fixed to the silo and bordered by raised sidewalls, in which the sieve-grate 20 can be raised and lowered in the direction of the arrows 30', 30" with the aid of the hydraulic cylinders 32. The counter-surface 22 is therein formed by the inner surface of the silo lid 34 in its closed condition (FIGS. 1a and b). The filling of the feed part 16 with sewage sludge is accomplished by a not-shown transport truck from ramp 36 with a lowered sieve-grate 20 and opened silo lid 34. The feed part 16 is so dimensioned, that it can just receive a transport truck-load of sewage sludge. After the filling process, the silo lid 34 is brought to the closed position shown in FIGS. 1a and b and the sieve-grate 20 is subsequently moved, with the aid of the hydraulic cylinder, in the direction of the arrow 30' 30 in the direction of the counter-surface 22. Thereby the fine particulate or pasty sludge components are pressed through the sieve-grate 20 into the sludge-receiving part 12, while the larger foreign bodies 26 contained within the sludge remain on the upper side of the sieve-grate 20. After reaching the upper end position of the sieve-grate 20 (FIGS. 1c and d), the silo lid 34 is opened in the direction of the arrow 38 with hydraulic means so that the foreign bodies situated on the sieve-grate 20 are accessible from the outside. They can either be removed manually or, with the aid of a motor driven wiper 40, can be carried out in the direction of the arrows 42, 44 to the solid body outlet 24 and to the solid body chamber 26. After retraction of the clearing wiper 40 and lowering of the sieve-grate 20 to its lower end position, the feed part 16 is available for a further charge of sludge.

In the embodiment shown in FIGS. 2a and b the separation device 18 includes a silo-fixed sieve-grate 20', while the counter-surface 22 is provided on a pressure plate 46 which can be raised and lowered via hydraulic cylinders 32' in the direction of the double arrows 30', 30". Further, feed frames 28' are provided there, which in the area of feed part 16 are slideable sideaways with respect to the silo 10 in the direction of the arrows 54', 54" from a fill station 48 to a press station 50 and from there to a discharge station 52. In the fill station 48, the supply frame which is upwardly and downwardly open, stands upon a base 56 on the same plane as the sieve-grate 52 and can be filled with sewage sludge from ramp 36 by a transport truck. The full feed frame 28' is then pushed in the direction of the arrow 54' with raised pressure plate 46 to the press station 50. There the sludge is pressed through the sieve-grate 20' under displacement of the pressure plate 46 in the direction of the arrow 30' with the aid of the hydraulic cylinder, until only the sewage sludge contaminated foreign bodies remain on the sieve-grate. After lifting out of the pressure plate 46 out of the feed frame 28, this can be pushed or displaced in the direction of the discharge station 52 with taking along the foreign bodies. Thereby the foreign bodies carried along through the foreign body outlet 24 reach the outside. After return of the feed frame 28' from the discharge station to the fill station a further charge of sludge can be introduced.

In the illustrative variation shown in FIGS. 3a and b, the separator device 18 exhibits a sieve-grate 20" rotating in the direction of the arrow 58 by means of the rotational driver 60, while the counter-surfaces 22 are formed by the wipers 62 of which the wiper surfaces lie diagonally in the direction of the sieve-grate against the sieve-grate 20". The sieve-grate 20" is positioned on the silo radially over the radial guide rollers 74 and axially over the axial guide rollers 76, of which respectively a plurality is provided on the silo jacket and distributed about the circumference. The sieve-grate 20" is surrounded by a jacket 64 fixed to the silo, which includes two radial openings 68 lying diametrically opposite to each other, each forming respectively one foreign body outlet 24 closeable with a flap 66. The foreign bodies which remain upon the upper surface of the sieve-grate 20", which do not pass through the sieve openings 69 of the sieve-grate 20", ultimately end up radially outwards as a result of the action of centrifugal force and are retained there by a foreign body catcher 70 and upon opening of the flaps 66 are conveyed into the foreign body outlet 24. Further, there are provided here two radially oriented abutment or stop edges or walls 72 fixed to the silo close to and above the sieve-grate 20", via which, due to the rotating sieve-grate 20", through which larger foreign bodies stopped by the rotating sieve-grate 20" and directed radially outwards. The stop walls 72 simultaneously serve as the stops for the wipers 62.

In summary, the following is to be concluded: The invention relates to a silo for sludge, especially sewage sludge, comprising a sludge-receiving part 12, a feeding part 16, said feeding part being located above the sludge-receiving part 12 and communicating with said sludge-receiving part 12 via an inlet 14, and a sludge-discharge device. Said sludge-discharge device is located in the lower area of the sludge-receiving part, and can preferably be connected to a pipeline system. According to the invention, a separator device 18 for removing foreign bodies is located in the area of the feeding part 16 so that the sludge which is temporarily stored in the silo can easily be used later on. Said separating device for removing foreign bodies 18 has a sieve-grate 20 covering the inlet and at least one counter-surface 22 positioned above said sieve-grate 20. Said sieve-grate and said counter-surface are able to move in relation to each other as sludge pushes through the sieve openings of said sieve-grate.

What is claimed is:

1. Silo for sludges with
   a sludge-receiving part (12),
   a feeding part (16) positioned above the sludge-receiving part (12) and in communication therewith via a large surface area inlet opening (14),
   a sludge outlet located in the lower area of the sludge receiving part (12), and
   a separating device (18) for separating foreign bodies from sludge provided at the inlet side, wherein said separating device (18) is provided in the feeding part (16),
      wherein the foreign-body separating device (18) includes a sieve-grate (20, 20', 20") positioned above the inlet opening (14) and at least one counter-surface (22) positioned above the sieve-grate, said sieve grate and counter-surface moveable relative to each other to push sludge through the sieve openings of the sieve-grate,
      wherein the foreign body separating device (18) includes a feed frame (28, 28') having an opening for receiving sludge and including a raised sidewall, which feed frame is so positioned or positionable between the sieve-grate (20, 20') and the counter-surface (22), that the sieve-grate and the counter-surface are moveable relative to each other perpendicular to the frame opening, and
      wherein the counter-surface (22) is formed by an inner surface of a silo lid (34) covering the feed part (16), and that the sieve-grate (20) is displaceable through the feed frame (28), which is provided fixed to the silo, in the direction of the silo lid (34) by drive means (32).

2. A silo according to claim 1, wherein the foreign body separating device (18) includes at least one foreign body outlet (24) provided on the side of the sieve-grate (20, 20', 20") opposite to the sludge-receiving part (12).

3. A silo according to claim 1, wherein the foreign body separating device (18) comprises a wiper (40) moveable parallel to the upper surface of the sieve-grate (20) in the direction of a foreign body outlet.

4. A silo according to claim 3, wherein the foreign body outlet (24) opens into a foreign body chamber (26).

5. Silo according to claim 4, wherein the foreign body chamber (26) can be acted upon by water for cleansing of sewage sludge from the foreign bodies, and is connected via a sewage sludge conveyor part with the sludge-receiving part (12).

6. A silo according to claim 1, further comprising a hydraulic drive having four simultaneously operable hydraulic cylinders (32, 32') engaging in the edge area of the sieve-grate (20).

* * * * *